Dec. 13, 1966 R. K. JOHNSON 3,290,785
DEVICE FOR MEASURING LENGTH OF MOTION-PICTURE FILM IN A ROLL
Filed Jan. 24, 1964

INVENTOR.
RAYMOND K. JOHNSON
BY Lyon & Lyon
ATTORNEYS

United States Patent Office 3,290,785
Patented Dec. 13, 1966

3,290,785
DEVICE FOR MEASURING LENGTH OF MOTION-PICTURE FILM IN A ROLL
Raymond K. Johnson, Hollywood, Calif., assignor to Metro-Goldwyn-Mayer Inc., Culver City, Calif., a corporation of Delaware
Filed Jan. 24, 1964, Ser. No. 339,940
10 Claims. (Cl. 33—128)

This invention relates to an apparatus for measuring the length of film in a roll and is particularly directed to a device which may be used in a darkroom for measuring the footage of motion-picture negative film contained in rolls of various diameters.

In use, the negative film in a roll is mounted within a film magazine in a darkroom and the film magazine is then marked or tagged to show the total length of film on the roll. In the case of a full roll, this is one thousand feet, but if part of a full roll has been used previously, the remaining unexposed portion may be of any lesser length. The loaded film magazine is later attached to a motion-picture camera, and the cameraman watches the footage meter on the camera so that he does not run out of film. The film magazine is removed from the camera and a fresh magazine loaded with unexposed film is installed before there is any real danger of running out of film during filming of a scene.

It is important that the film footage marked or tagged on the film magazine be accurate, in order to eliminate costly delays and retakes caused by the camera running out of film during filming of a scene. Accordingly, it is the principal object of the present invention to provide a simple, foolproof mechanical device that can be operated in total darkness in a darkroom for determining the length of motion-picture film in a roll.

Another object of this invention is to provide a device of this type which employs an arm movable into contact with the outer surface of the film roll together with means for indicating the position of the arm on a record sheet scale, the scale being calibrated to show the number of feet of film in the roll.

Other and more detailed objects and advantages will appear hereinafter.

Figure 1:
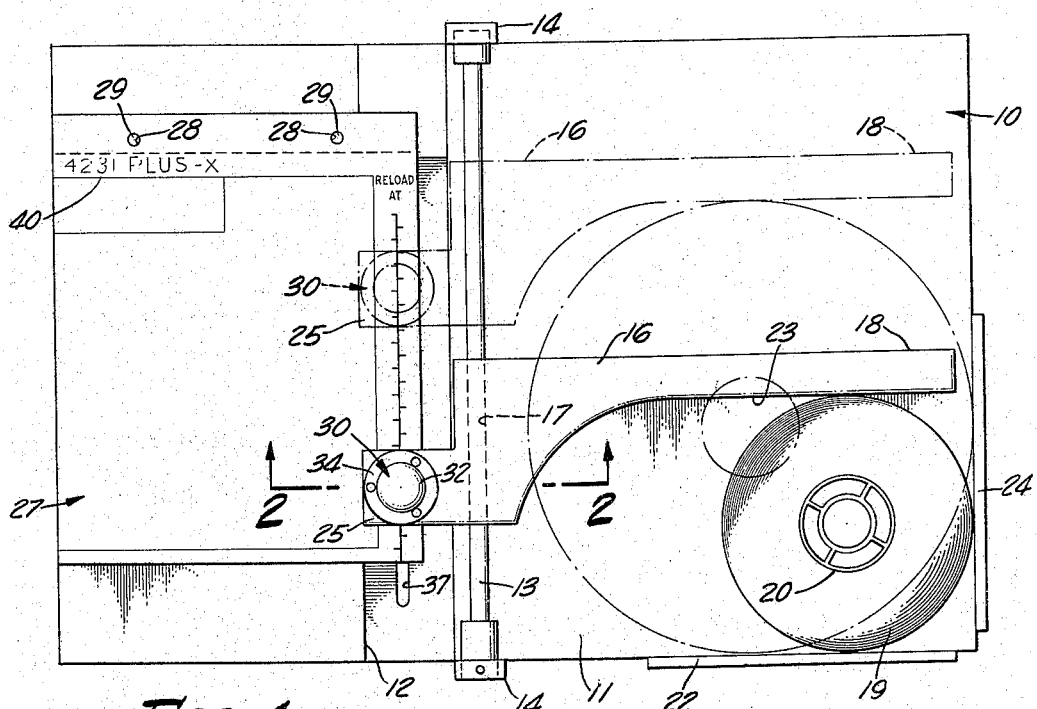
FIGURE 1 is a top plan view showing a preferred embodiment of this invention.
Figure 2:
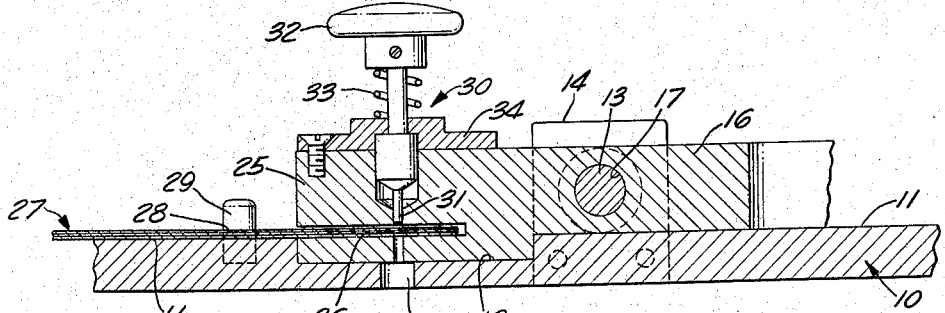
FIGURE 2 is a sectional elevation taken substantially on the lines 2—2 as shown in FIGURE 1.
Figure 3:
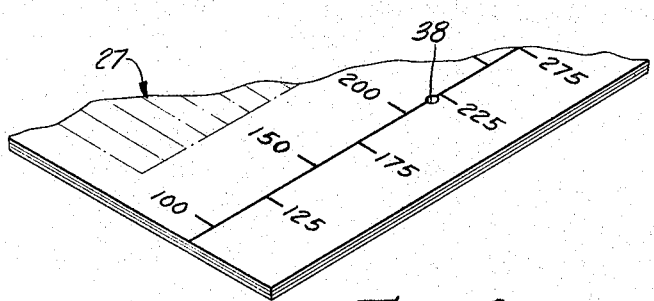
FIGURE 3 is a perspective view partly broken away showing a portion of the record sheet and the scale printed thereon.

Referring to the drawings, the base 10 has a flat upper surface 11 traversed by a shallow channel 12. A guide rod 13 is mounted above the base surface 11 and extends parallel to the shallow channel 12. The guide rod is held in position by support brackets 14 fixed to the base 10. A slide bar 16 is provided with a bore 17 for sliding reception of the guide bar 13. A straight arm portion 18 is adapted to contact the outer surface of a roll 19 of motion-picture negative film. This roll of film is mounted on a standard size spool 20. A first stop rail 22 is fixed to the base 10 and extends above the surface 11 and is parallel to the surface 23 on the guide bar 16. Another guide rail 24 is positioned at right angles to the first guide rail 22 and is mounted on the base 10 in a similar manner.

The arm 18 of the slide bar 16 extends in one direction from the guide rod 13, and the block 25 on the slide bar 16 extends in the other direction from the guide rod 13. The block 25 has a lower portion which slides within the channel 12 on the base 10.

A record sheet 27 is provided with apertures 28 for registry with upstanding pins 29 fixed in the base 10. These pins serve to locate the record sheet in a predetermined position on the surface 11 of the base 10. A scale is printed along the one edge of the record sheet 27, and this scale is calibrated to show the number of feet of film in the roll 19. Means are provided on the block 25 of the slide bar 16 for marking the scale at any point along its length, and as shown in the drawings, this means includes a punch device, generally designated 30. This punch device includes a movable plunger element 31 adapted to punch a hole 38 in the scale on the record sheet 27. The upper end of the movable element 31 is provided with knob 32 for manual actuation. A coil compression spring 33 acts to hold the parts 31 and 32 in upper position, and the spring acts against a removable retainer plate 34 mounted on the block 25. A clearance slot 36 is provided in the block 25 for reception of one edge of the record sheet 27, and a clearance groove 37 is provided in the base 10, parallel to the guide rod 13 and positioned directly below the path of travel of the movable punch element 31.

In operation, a roll 19 to be measured is placed on the surface 11 of the base 10 and moved into contact with the guide rails 22 and 24. The slide bar 16 is then moved toward the guide rail 22 to bring the surface 23 of the arm 18 into contact with the film 19. The knob 32 is then depressed to cause a hole 38 to be punched in the scale of the record sheet 27. Several copies of the record sheet 27 interleaved with carbon paper may be employed, if desired. The scale is calibrated for the particular type of negative film being measured. Color negative film, for example, has greater thickness than conventional black-and-white film, and therefore a roll of color negative film contains less footage than a roll of conventional black-and-white film of the same outer diameter. A legend 40 on the record sheet 27 identifies the type of film being measured.

The phantom-line position of the part shown in FIGURE 1 shows measurement of a relatively large diameter roll of film.

The device is conveniently operated in a darkroom and with minimum danger of error. The operator chooses a record sheet which shows by its legend 40 that it is intended for use with negative film of the type being measured. The record sheet 27 is placed in position on the index pins 29. The operator then places the roll 19 of film to be measured on the upper surface of the base 10 and manually moves it against the guide rails 22 and 24. He then moves the slide bar 16 along the guide rod 13 until the arm 18 contacts the roll 19. He then depresses the knob 32, and the measurement operation is complete. The roll of film 19 is installed in a film magazine, and one copy of the record sheet 27 is attached to the same magazine. An accurate measurement of the film footage within the film magazine is thus shown on the outside of the magazine.

Having fully described my invention, it is to be understood that I am not to be limited to the details herein set forth, but that my invention is of the full scope of the appended claims.

What is claimed is:

1. In a device for measuring the length of motion picture film in a roll, the combination of: a base, a stop rail on the base, guide means on the base, a slide bar mounted to move along said guide means and having an arm parallel to the stop rail, said arm of the slide bar and said stop rail being adapted to contact a roll of film positioned between them on said base, indexing means on said base, a sheet adapted to rest on said base and having means registering with said indexing means to locate said sheet on said base in a predetermined position, said sheet having a scale thereon extending parallel to said guide means, and a marking device carried on said slide bar for marking a point on said scale in accordance with the position of said slide bar.

2. In a device for measuring the length of motion picture film in a roll, the combination of: a base, a stop rail on the base, guide means on the base, a slide bar mounted to move along said guide means and having a straight arm portion parallel to the stop rail, said portion of the slide bar and said stop rail being adapted to contact a roll of film positioned between them on said base, indexing pins projecting from said base, a sheet adapted to rest on said base and having apertures registering with and receiving said indexing pins to locate said sheet on said base in a predetermined position, said sheet having a scale thereon extending parallel to said guide means, and a marking device carried on said slide bar for marking a point on said scale in accordance with the position of said slide bar.

3. In a device for measuring the length of motion picture film in a roll, the combination of: a base having a surface for supporting a roll of film, a stop rail on the base, a guide rod on the base, a slide bar mounted to move along the guide rod and having a straight arm portion parallel to the stop rail, said portion of the slide bar and said stop rail being adapted to contact a roll of film positioned between them on said base surface, indexing pins on said base projecting from said surface, a sheet adapted to rest on said surface and having apertures registering with and receiving said indexing pins to position said sheet on said base surface in a predetermined position, said sheet having a scale thereon extending parallel to said guide rod, and a marking device carried on said slide bar for marking a point on said scale in accordance with the position of said slide bar on said guide rod.

4. In a device for measuring the length of motion picture film in a roll, the combination of: a base having a surface for supporting a roll of film, a stop rail on the base, a guide rod on the base, a slide bar mounted to move along the guide rod and having an arm portion on one side of the guide rod and extending parallel to the stop rail, said arm portion of the slide bar and said stop rail being adapted to contact a roll of film positioned between them on said base surface, indexing pins on said base projecting from said surface, a sheet adapted to rest on said surface on the other side of said slide bar and having apertures registering with and receiving said indexing pins to locate said sheet on said base surface in a predetermined position, said sheet having a scale thereon extending parallel to said guide rod, and a marking device carried on said slide bar on the other side of the guide rod from said arm portion for marking a point on said scale in accordance with the position of said slide bar on said guide rod.

5. In a device for measuring the length of motion picture film in a roll, the combination of: a base having a surface for supporting a roll of film, a stop rail on the base, a guide rod on the base, a slide bar mounted to move along the guide rod and having an arm on one side of the guide rod and extending parallel to the stop rail, said arm portion of the slide bar and said stop rail being adapted to contact a roll of film positioned between them on said base surface, said base having a groove in said surface extending parallel to said guide rod, indexing means on said base, a sheet adapted to rest on said surface and having means registering with said indexing pins to locate said sheet on said base surface in a predetermined position, said sheet having a scale thereon extending parallel to said guide rod and positioned over said groove, and a punching device carried on said slide bar for punching a hole in said sheet along said scale in accordance with the position of said slide bar on said guide rod, said punching device including a punch element movable through said sheet and into said groove.

6. In a device for measuring the length of motion-picture film in a roll, the combination of: a base, a stop rail on the base, guide means on the base, a slide bar mounted to move along said guide means and having an arm parallel to the stop rail, said arm of the slide bar and said stop rail being adapted to contact a roll of film positioned between them on said base, marking means carried on said slide bar on the other side of said guide means from said arm of said slide bar, and indexing means on said base for positioning a sheet having a scale thereon with the scale parallel to said guide means, said marking means being actuable to mark a point on said scale in accordance with the position of said slide bar to indicate the length of film in a roll.

7. In a device for measuring the length of motion-picture film in a roll, the combination of: a base, a stop rail on the base, guide means on the base, a slide bar mounted to move along said guide means and having an arm parallel to the stop rail, said arm of said slide bar and said stop rail being adapted to contact a roll of film positioned between them on said base, marking means carried on said slide bar on the other side of said guide means from said arm of said slide bar, and indexing means on said base for positioning a sheet having a scale thereon with the scale parallel to said guide means and adjacent said marking means, said marking means having a depressable member which is actuable to mark a point on said scale in accordance with the position of said slide bar to indicate the length of film in a roll.

8. In a device for measuring the length of motion-picture film in a roll, the combination of: a base having a surface for supporting a roll of film, a stop rail on the base, a guide rod on the base, a slide bar mounted to move along the guide rod and having an arm portion on one side of the guide rod and extending parallel to the stop rail, said arm portion of the slide bar and said stop rail being adapted to contact the periphery of a roll of film positioned between them on said base surface, indexing pins on said base projecting from said surface on the other side of said slide bar for positioning a sheet having a scale thereon with the scale parallel to the guide rod, and a marking device carried on said slide bar on the other side of the guide rod from said arm portion for marking the scale in accordance with the position of said slide bar on said guide rod to indicate the length of film in a roll.

9. In a device for measuring the length of motion-picture film in a roll, the combination of: a base having a surface for supporting a roll of film, a stop rail on the base, a guide rod on the base, a slide bar mounted to move along the guide rod and having an arm portion on one side of the guide rod and extending parallel to the stop rail, said arm portion of the slide bar and said stop rail being adapted to contact the periphery of a roll of film positioned between them on said base surface, a marking device carried on said slide bar on the other side of the guide rod from said arm portion, and indexing pins on said base projecting from said surface of the other side of said slide bar for positioning a sheet having a scale thereon with the scale parallel to the guide rod, said marking device being actuable to punch a hole in the scale in accordance with the position of said slide bar on said guide rod to indicate the length of film in a roll.

10. In a device for measuring the length of motion-picture film in a roll, the combination of: a base having a surface for supporting a roll of film, a stop rail on the base, a guide rod on the base, a slide bar mounted to move along the guide rod and having an arm portion on one side of the guide rod and extending parallel to the stop rail, said arm portion of the slide bar and said stop rail being adapted to contact the periphery of a roll of film positioned between them on said base surface, indexing means on said base on the other side of said slide bar, a sheet adapted to rest on said surface on the other side of said slide bar and registering with said indexing means to locate said sheet on said base surface in a predetermined position, said sheet having a scale thereon bearing a predetermined relationship to the type of film to be measured and extending parallel to said guide rod, and a marking device carried on said slide bar on the other side of the guide rod from said arm portion for marking a point on said scale in accordance with the position of said slide bar on said guide rod.

References Cited by the Examiner

UNITED STATES PATENTS 589,160  8/1897  Butler _____ 33—128

FOREIGN PATENTS 18,533  1/1909  Norway.

LEONARD FORMAN, *Primary Examiner.*

HARRY N. HAROIAN, *Assistant Examiner.*